(12) United States Patent
Erickson et al.

(10) Patent No.: US 12,579,596 B2
(45) Date of Patent: Mar. 17, 2026

(54) MANAGING ARTIFICIAL INTELLIGENCE DERIVED IMAGE ATTRIBUTES

(71) Applicant: Adobe Inc., San Jose, CA (US)

(72) Inventors: Alan L Erickson, Highlands Ranch, CO (US); Sarah Kong, Cupertino, CA (US); Betty Leong, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 889 days.

(21) Appl. No.: 17/584,140

(22) Filed: Jan. 25, 2022

(65) Prior Publication Data

US 2023/0128276 A1      Apr. 27, 2023

Related U.S. Application Data

(60) Provisional application No. 63/271,148, filed on Oct. 23, 2021.

(51) Int. Cl.
G06T 1/00 (2006.01)
G06V 10/82 (2022.01)
(52) U.S. Cl.
CPC ............ G06T 1/0007 (2013.01); G06V 10/82 (2022.01)

(58) Field of Classification Search
CPC ....... G06T 1/0007; G06V 10/82; G06V 20/70
See application file for complete search history.

(56) References Cited

U.S. PATENT DOCUMENTS

| 10,777,228 | B1 * | 9/2020 | Wilson | G11B 27/02 |
|---|---|---|---|---|
| 2014/0241592 | A1 * | 8/2014 | Yang | G06T 5/60 |
| | | | | 382/118 |
| 2014/0282586 | A1 * | 9/2014 | Shear | G06F 9/5072 |
| | | | | 718/104 |
| 2018/0225812 | A1 * | 8/2018 | DiVerdi | G06V 10/764 |

* cited by examiner

*Primary Examiner* — Michael J Vanchy, Jr.
(74) *Attorney, Agent, or Firm* — Keller Preece PLLC

(57) ABSTRACT

The present disclosure relates to systems, non-transitory computer-readable media, and methods for determining whether a derived attribute from a request is stored at a derived attribute cache. In particular, in one or more embodiments, the disclosed systems obtain the derived attribute from artificial-intelligence models if the derived attribute is unavailable at the derived attribute cache. If the derived attribute is available at the derived attribute cache, the disclosed system returns the derived attribute in response to a request without having the artificial-intelligence models rederive the attribute.

20 Claims, 8 Drawing Sheets

100

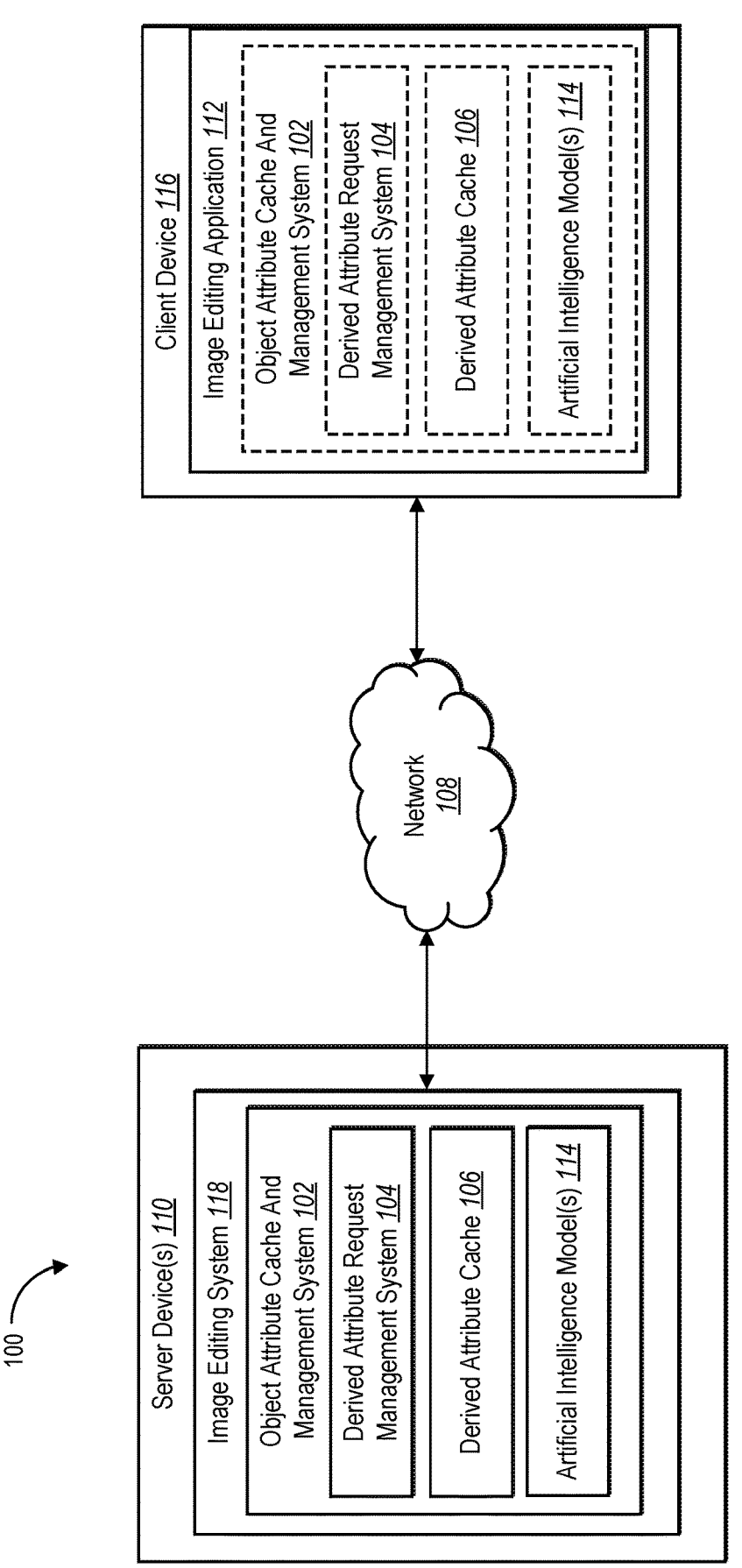

Client Device 116

Image Editing Application 112

Object Attribute Cache And Management System 102

Derived Attribute Request Management System 104

Derived Attribute Cache 106

Artificial Intelligence Model(s) 114

Network 108

Server Device(s) 110

Image Editing System 118

Object Attribute Cache And Management System 102

Derived Attribute Request Management System 104

Derived Attribute Cache 106

Artificial Intelligence Model(s) 114

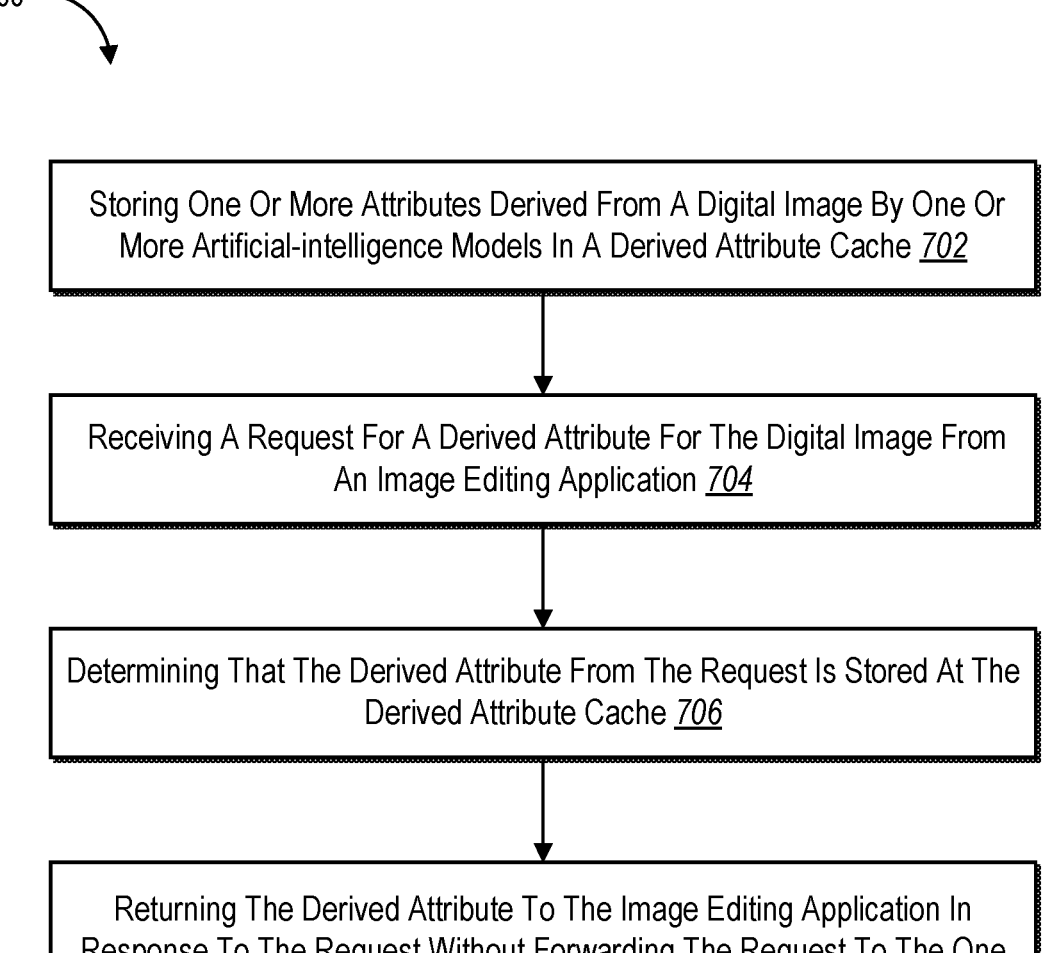

Storing One Or More Attributes Derived From A Digital Image By One Or More Artificial-intelligence Models In A Derived Attribute Cache _702_

Receiving A Request For A Derived Attribute For The Digital Image From An Image Editing Application _704_

Determining That The Derived Attribute From The Request Is Stored At The Derived Attribute Cache _706_

Returning The Derived Attribute To The Image Editing Application In Response To The Request Without Forwarding The Request To The One Or More Artificial-intelligence Models Configured To Generate The Derived Attribute _708_

*Fig. 7*

MANAGING ARTIFICIAL INTELLIGENCE DERIVED IMAGE ATTRIBUTES

CROSS-REFERENCE TO RELATED APPLICATIONS

This application claims priority to and the benefit of U.S. Provisional Patent Application No. 63/271,148, filed Oct. 23, 2021, which is incorporated herein by reference in its entirety.

BACKGROUND

Recent years have seen a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables both professionals and hobbyists to perform a variety of digital image editing operations. Similarly, improvements in software enable individuals to modify, filter, or otherwise edit digital images across a variety of computing devices.

Recent years have seen significant improvements in editing images. For example, one advancement in conventional systems is the use of machine learning models, such as neural networks, to perform various computer vision tasks, to generate images, or to edit images. To illustrate, neural networks are able to generate various derived attributes (object classification, object location, object masks, face detection, depth map or values, etc.).

Unfortunately, conventional image editing systems are inefficient. For example, many desired attributes derived from images useful for editing images are generated by relatively computationally heavy algorithms (e.g., neural networks). Conventional systems are able to retain such generated attributes for a limited amount of time. As such, once an image is modified or after a predetermined amount of time, if a user desires to access or use the attribute, conventional systems often have to reprocess the image using the computationally heavy algorithm to re-generate the attribute. Along related lines, when editing a digital image, multiple different edit workflows require use of the same derived attributes. As an edit workflow in conventional systems typically do not share information, conventional systems often re-run the computationally heavy algorithm to re-generate the attribute in response to a second edit workflow despite having generated the same attribute in a previous or parallel edit workflow. In these and other use cases, conventional systems waste both time and valuable computing resources.

Along related lines, conventional systems are often inefficient because the processing power used by the machine learning algorithms require a lot of time and cause latencies. For example, a user of an editing application may utilize a neural network for editing an image, but due to latencies resulting from the use of neural networks, the user may close out of the application. The user typically closes out of the application due to long wait times associated with resuming normal editing operations. The latencies from the use of neural networks often are a result of the computationally heavy neural networks that require a vast amount of processing power.

BRIEF SUMMARY

Embodiments of the present disclosure provide benefits and/or solve one or more of the foregoing or other problems in the art with systems, non-transitory computer-readable media, and methods include a universal interface for managing artificial-intelligence based derived attributes from digital images. For example, the disclosed system stores one or more attributes derived from a digital image by artificial-intelligence models in a derived attribute cache. In response to the disclosed system receiving a request for a derived attribute, the disclosed system determine if the derived attribute is available at the derived attribute cache. Moreover, if the disclosed system determines that the derived attribute is unavailable at the derived attribute cache, then the disclosed system obtains the derived attribute from an artificial-intelligence model. While, if the derived attribute is available at the derived attribute cache, the disclosed system returns the derived attribute. In this manner, the disclosed system allows for efficient reuse of derived attributes and avoids the use of unnecessary computing resources.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 1 illustrates a diagram of an environment in which an object attribute cache and management system operates in accordance with one or more embodiments.

FIG. 7 illustrates a schematic diagram of an example architecture of the object attribute cache and management system in accordance with one or more embodiments of the present disclosure.

DETAILED DESCRIPTION

Figure 2:
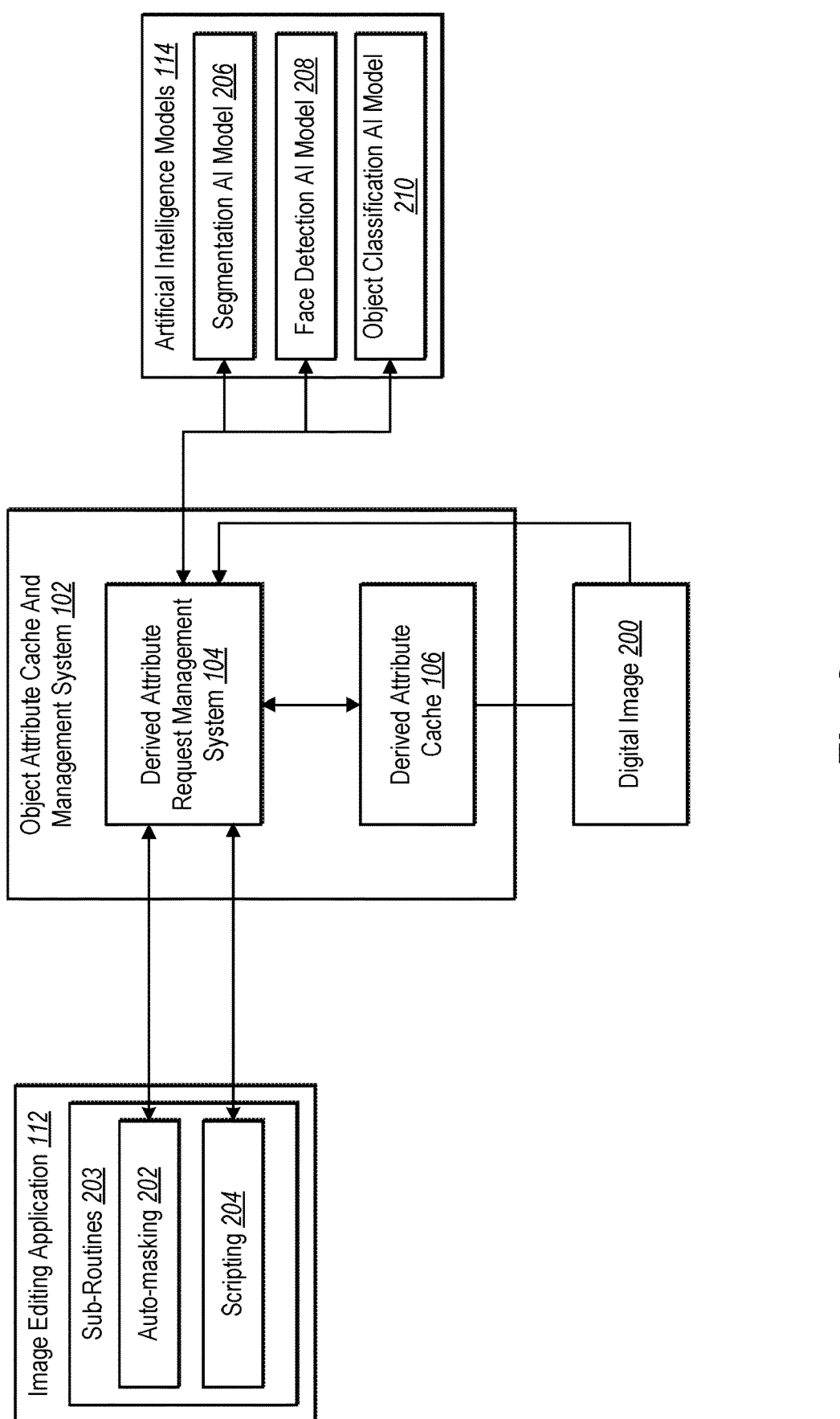
FIG. 2 illustrates a block diagram of the object attribute cache and management system interacting with artificial-intelligence models and an image editing application in accordance with one or more embodiments.

This disclosure describes one or more embodiments of an object attribute cache and management system that provides a universal interface for managing requests for artificial-intelligence sourced attributes from a digital image. In particular, an object attribute cache and management system includes a centralized application programming interface which manages requests for artificial-intelligence based derived attributes. The object attribute cache and management system further includes a derived attribute cache for holding previously generated attributes for quick retrieval and reuse. To elaborate, the object attribute cache and management system receives a request for a derived attribute of a digital image and determines whether the derived attribute cache holds the requested derived attribute. If so, then the object attribute cache and management system retrieves and returns the derived attribute. If the object attribute cache and management system determines the unavailability of the derived attribute in the derived attribute cache, the object attribute cache and management system sends a request to one or more artificial-intelligence models to derive the derived attribute. Furthermore, the object attribute cache and management system determines whether a prior request corresponds with the received request and merges the prior request with the request to prevent the object attribute cache and management system from processing repetitive requests.

As mentioned above, the object attribute cache and management system stores sourced derived attributes in a derived attribute cache. In particular, the object attribute cache and management system requests derived attributes from one or more artificial intelligence models. For example, the object attribute cache and management system requests derived attributes such as location of human faces, location of objects, object classifications, depth information, latent features, etc. The object attribute cache and management system, upon receiving the derived attributes from the one or more artificial intelligence models, stores the derived attributes in a derived attribute cache.

As also mentioned, the object attribute cache and management system receives a request for a derived attribute. The object attribute cache and management system receives a request via an application programming interface that manages incoming requests for derived attributes. As discussed above, the object attribute cache and management system determines the availability of a requested derived attribute. For example, the object attribute cache and management system determines whether a requested derived attribute is available in the derived attribute cache. Furthermore, in response to this determination, the object attribute cache and management system returns the derived attribute to an image editing application without forwarding the request to artificial-intelligence models configured to generate the derived attribute. In particular, the object attribute cache and management system determines the availability of the derived attribute by comparing metadata of the request for the derived attribute with metadata of a plurality of derived attributes in the derived attribute cache.

As mentioned above, the object attribute cache and management system, in one or more embodiments, determines the unavailability of a derived attribute in the derived attribute cache. In response, the object attribute cache and management system sends instructions to one or more artificial-intelligence models to generate the derived attribute. The artificial-intelligence algorithms operate in the background of the image editing application during processing. Thus, a user is able continue to use the image editing application without any issues with latency while the application programming interface or artificial-intelligence models operate. Upon receiving the derived attribute from the one or more artificial-intelligence models, the object attribute cache and management system stores the derived attribute in the derived attribute cache and returns the derived attribute to the image editing application in response to the request for the derived attribute.

As discussed, the object attribute cache and management system, in one or more implementations, merges requests for derived attributes. The object attribute cache and management system merges requests for derived attributes by determining that a request for a derived attribute is for the same derived attribute requested in a prior request that has yet to be received from the one or more artificial intelligence models. The object attribute cache and management system associates the request with the prior request. When the object attribute cache and management system receives the derived attribute from one or more artificial-intelligence models based on instructions sent to the artificial-intelligence models, the object attribute cache and management system returns the derived attribute in response to both the request and the prior request.

As just mentioned, the object attribute cache and management system processes requests for derived attributes. When the object attribute cache and management system completes processing (i.e., the artificial-intelligence algorithms have completed deriving the attribute), the object attribute cache and management system sends a notification to the image editing application. For example, the object attribute cache and management system sends a notification sends a notification including a message that the object attribute cache and management system has completed processing of the derived attribute.

In one or more implementations, the object attribute cache and management system monitors and detects changes to the digital image. For example, the object attribute cache and management system detects changes, such as but not limited to, pixel changes in the digital image. Subsequently the object attribute cache and management system determines whether a derived attribute corresponding to the pixel change is obsolete. If the derived attribute corresponding to the pixel change is obsolete (e.g., is no longer applicable because the pixel upon which the derived attribute is based have changed), then the object attribute cache and management system removes the derived attribute from the derived attribute cache. For example, the object attribute cache and management system detects pixel changes in the digital image as individual layer changes or composite layer changes. Similar to the previous paragraph, the object attribute cache and management system sends, in one or more implementations, a notification of the removal/deletion of a derived attribute from the derived attribute cache in response to detecting changes and deleting a derived attribute.

Moreover, in addition to detecting changes, the object attribute cache and management system is also able to detect change reversions. For example, if the user of an image editing application undoes a change to the digital image, the object attribute cache and management system detects the reversion. In response to detecting the reversion, the object attribute cache and management system, in one or more implementations, restores a derived attribute corresponding to the reversion of the change to the derived attribute cache.

As mentioned above, an object attribute cache and management in one or more implementations improves the efficiency, increases speed, and reduces duplicative computing for an image editing system. Currently various state of the art image editing systems, like PHOTOSHOP, rely on artificial intelligence algorithms to generate derived attributes from document imagery (e.g., digital images). A derived attribute is a characteristic or attribute extracted from, inferred or derived from, or generated based on a digital image by a machine learning algorithm. Example derived attributes include location of human faces, location of objects (such as people, cars, animals, etc.), object classification (such as foreground, background, sky, car, human, ball, etc.), depth information (e.g., depth maps), deep or latent features (e.g., a feature map), etc. Indeed, many different editing workflows (e.g., face touching up, object removal, object replacement, filtering, sharpening, etc.) rely upon derived attributes.

Unfortunately, conventional digital image editing systems lack efficiency with respect to the generation and use of derived attributes. For example, conventional systems retain such derived attributes for a limited amount of time. As such, once an image is modified or after a predetermined amount of time, if a user desires to access or use the derived attribute (knowingly or unknowingly), conventional systems have to reprocess the image using the computationally heavy algorithm to re-generate the derived attribute. Along related lines, when editing a digital image, multi different edit workflows occasionally require use of the same derived attributes. As the edit workflow in conventional systems typically do not share information, conventional systems will re-run the computationally heavy algorithm to re-generate the derived attribute in response to a second edit workflow despite having generated the same attribute in a previous or parallel editing workflow. In these and other use cases, conventional systems waste both time and valuable computing resources.

As such, the object attribute cache and management system is able to improve on the efficiency of conventional systems by reducing the use of computationally heavy algorithms. The object attribute cache and management system accomplishes this by storing one or more attributes derived from a digital image by artificial-intelligence models in a derived attribute cache and by returning available derived attributes from the derived attribute cache. By storing derived attributes in the derived attribute cache and determining whether a request for a derived attribute is already stored in the derived attribute cache, the object attribute cache and management system eliminates repetitive requests to the computationally heavy algorithms.

The object attribute cache and management system also retains derived attributes more efficiently. Due to the object attribute cache and management system utilizing a derived attribute cache, if a user desires to access or use a derived attribute, the object attribute cache and management system does not need to reprocess the image utilizing artificial intelligence models. Instead, the object attribute cache and management system is able to access the already derived attributes in the derived attribute cache.

Furthermore, the object attribute cache and management system improves upon multiple workflows obtaining the same derived attribute and causing computationally heavy algorithms to re-generate derived attributes. The object attribute cache and management system utilizes a central application programming interface to manage requests for artificial-intelligence based derived attributes, accordingly, requests from multiple workflows requesting the same attribute pass through the central application programming interface. This allows the object attribute cache and management system to eliminate repetitive requests from different features/workflows in the image editing application.

The aforementioned features of the object attribute cache and management system also contributes to increasing the speed of the image editing application receiving derived attributes and reducing latencies in the system. Accordingly, the object attribute cache and management system improves upon inefficiencies in conventional systems by conserving computational power and removing computational burdens.

Additional detail regarding the object attribute cache and management system will now be provided with reference to the figures. For example, FIG. 1 illustrates a schematic diagram of a system environment 100 that includes an object attribute cache and management system 102 (also called Photoshop Intelligence Framework or PIF), server device(s) 110, a network 108, a client device 116, an image editing application 112, and one or more artificial-intelligence models 114.

Although the system environment 100 of FIG. 1 is depicted as having a particular number of components, the system environment 100, in one or more implementations, has another number devices or additional/alternative components (e.g., server devices, client devices, or other components in communication with the object attribute cache and management system 102 via the network 108). Similarly, although FIG. 1 illustrates a particular arrangement of the server device(s) 110, the network 108, and the client device 116, various additional arrangements are possible.

The server device(s) 110, the network 108, and the client device 116 are communicatively coupled with each other either directly or indirectly (e.g., through the network 108 discussed in greater detail below in relation to FIG. 8). Moreover, the server device(s) 110 and the client device 116 include computing devices such as those discussed in greater detail with relation to FIG. 8.

As shown in FIG. 1, the system environment 100 includes the server device(s) 110, which in one or more implementations, implement the object attribute cache and management system 102 and the artificial intelligence model(s) 114. In one or more embodiments, the server device(s) 110 generate, store, receive, and/or transmits data including digital visual media items, derived attributes (e.g., segmentation masks), or modified digital visual media items. For example, in some embodiments, the server device(s) 110 receives a digital visual media item from a client device (e.g., the client device 116) and transmits a derived attribute, segmentation mask, or modified digital visual media item to the client device. In one or more embodiments, the server device(s) 110 comprise a data server. In some implementations, the server device(s) 110 comprises a communication server or a web-hosting server.

In one or more embodiments, the image editing system 118 provides functionality by which a user (e.g., a user a client device 116) generates, edits, manages, and/or stores digital images. For example, in some instances, a user utilizes the image editing application 112 on the client device 116 to send a digital image to the image editing system 118 hosted on the server device(s) 110 via the network 108. The image editing system 118 then provides many options that the user may use to edit the digital image, store the digital image, and subsequently search for, access, and view the digital image.

In one or more embodiments, the client device 116 includes a device able to access, edit, segment, modify, store, and/or provide, for display, digital images. For example, the client device comprises a smartphone, tablet, desktop computer, laptop computer, head-mounted-display device, or other electronic device. The client device 116 further includes one or more applications (e.g., the image editing application 112) that allows a user to access, edit, segment, modify, store, and/or provide, for display, digital images. For example, in one or more embodiments, the image editing application 112 includes a software application installed on the client device 116. Additionally, or alternatively, the image editing application 112 includes a software application hosted on the server device(s) 110 (and supported by the image editing system 118), which may be accessed by the client device 116 through an application, such as a web browser.

To provide an example implementation, in some embodiments, the image editing system 118 on the server device(s) 110 supports the image editing application 112 on the client device 116. For example, utilizing the image editing application 112 on the client device 116, the user performs an edit that requires a derived attribute (e.g., a segmentation mask). The image editing application 112 sends a request to the object attribute cache and management system 102. The derived attribute request management system 104 determines whether the requested derived attribute has previously been generated by the artificial intelligence model(s) 114 and stored in the derived attribute cache 106. If the requested derived attribute exists in the derived attribute cache 106, the object attribute cache and management system 102 returns the derived attribute to the image editing application 112 on the client device 116. If the derived attribute does not exist in the derived attribute cache 106, the object attribute cache and management system 102 sends instructions to the artificial intelligence model(s) 114 to generate the derived attribute. Upon generation of the derived attribute, the object attribute cache and management system 102 stores the derived attribute in the derived attribute cache 106 and then returns the derived attribute to the image editing application 112 on the client device 116.

In alternative implementations, the object attribute cache and management system 102 (in whole or part) is implemented by the client device 116. For example, in one or more implementations, the derived attribute request management system 104 and the derived attribute cache 106 reside on the client device 116 while the artificial intelligence model(s) 114 reside on the server device(s) 110. In still further implementations, one or more of the artificial intelligence model(s) 114 reside on the server device(s) 110 and one or more of the artificial intelligence model(s) 114 reside on the client device 116.

Indeed, the object attribute cache and management system 102 is able to be implemented in whole, or in part, by the individual elements of the system environment 100. Indeed, although FIG. 1 illustrates the object attribute cache and management system 102 implemented with regard to the server device(s) 110, different components of the object attribute cache and management system 102 are able to be implemented by a variety of devices within the system environment 100. For example, in one or more implementations, one or more (or all) components of the object attribute cache and management system 102 are implemented by a different computing device (e.g., the client device 116 or another remote server device).

As discussed above, the object attribute cache and management system 102 manages requests for derived attributes. As shown by FIG. 2, the object attribute cache and management system 102 comprises a derived attribute request management system 104 and a derived attribute cache 106. The derived attribute request management system 104, in one or more implementations, comprises a request application programing interface (API) that allows for communication between an image editing application 112 and the object attribute cache and management system 102. In one or more implementations, the request application programming interface of the derived attribute request management system 104 comprises a central application programming interface through which all request for derived attributes are received/managed. For example, the derived attribute request management system 104 receives all requests for derived attributes from the image editing application 112 via the central application programming interface. In this manner, the derived attribute request management system 104 is able to manage all request as explained in greater detail below.

The derived attribute cache 106 comprises a digital storage device for storing or holding previously requested derived attributes for quick retrieval and reuse. For example, the derived attribute cache 106 is a location for storing derived attributes. In particular, the derived attribute cache 106 includes stores attributes derived by artificial-intelligence models 114. To illustrate, the derived attribute cache 106 stores derived attributes from a digital image 200 and allows the object attribute cache and management system 102 to access the derived attributes to respond to requests for such by the image editing application 112.

A derived attribute comprises a characteristic or attribute extracted from, inferred or derived from, or generated based on a digital image by an artificial intelligence model. In particular, in one or more implementations, a derived attribute is an attribute that an artificial intelligence model derives or generates from pixels of a digital image 200. Example derived attributes include location of human faces, location of objects (such as people, cars, animals, etc.), object classification (such as foreground, background, sky, car, human, ball, etc.), depth information (e.g., depth maps), deep or latent features (e.g., a feature map), etc. Indeed, many different editing workflows (e.g., face touching up, object removal, object replacement, filtering, sharpening, etc.) rely upon derived attributes.

As mentioned, a derived attribute comprises a characteristic or attribute derived or generated from a digital image by an artificial intelligence model. In one or more implementations an artificial intelligence model comprises a computer representation that that is tunable (e.g., trained) based on inputs to approximate known or unknown functions. In particular, in some embodiments, an artificial intelligence model includes a machine-learning model that utilizes algorithms to learn from, and make predictions on, known data by analyzing the known data to learn to generate outputs that reflect patterns and attributes of the known data. For instance, in some implementations, a machine-learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

As mentioned above, artificial-intelligence models comprises machine learning models or neural networks. Generally, in one or more embodiments, a neural network includes a machine learning model that is tunable (e.g., trained) based on inputs to approximate unknown functions used for generating the corresponding outputs. Indeed, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

As shown by FIG. 2, in one or more implementations, the artificial intelligence models 114 comprises a segmentation artificial-intelligence (AI) model 206, a face detection AI model 208, and an object classification AI model 210. In alternative implementations, the artificial intelligence models 114 comprise different or additional AI models.

In one or more implementations, the segmentation AI model 206 comprises a segmentation neural network, such as, those described in previously incorporated U.S. Provisional Patent Application No. 63/271,148, filed Oct. 23, 2021. In alternative implementations, the segmentation AI model 206 comprises a panoptic segmentation neural network as described in U.S. patent application Ser. No. 17/319, 979, filed on May 13, 2021 and entitled "GENERATING IMPROVED PANOPTIC SEGMENTED DIGITAL IMAGES BASED ON PANOPTIC SEGMENTATION NEURAL NETWORKS THAT UTILIZE EXEMPLAR UNKNOWN OBJECT CLASSES," the entire contents of which are hereby incorporated by reference. In still further implementations, the segmentation AI model 206 comprises a class-agnostic object segmentation neural network as described in U.S. patent application Ser. No. 17/151,111, filed on Jan. 15, 2021 and entitled "GENERATING CLASS-AGNOSTIC OBJECT MASKS IN DIGITAL IMAGES," the entire contents of which are hereby incorporated by reference.

In one or more implementations, the face detection AI model 208 identifies faces in the images based on identifying one or more facial features or landmarks of a user's face. For example, the face detection AI model 208 identifies a person's face based on identifying visual element related to a user's face or head, such as a user's eyes, nose, mouth, hair, forehead, eyebrows, ears, hat, or glasses. In alternative implementations, the face detection AI model 208 detects faces in one or more images based on user input (e.g., the user selects one or more faces within one or more of the images). In one or more implementations, the face detection AI model 208 comprises a cascaded convolutional neural networks such as those described in U.S. Pat. No. 9,418,319, hereby incorporated by reference in its entirety. In other implementations, the face detection AI model 208 comprises a face detection algorithm such as those described in U.S. Pat. No. 9,940,544 hereby incorporated by reference in its entirety.

In one or more implementations, the object classification AI model 210 comprises a specialist object detection neural network (e.g., a sky detection neural network, a face detection neural network, a body detection neural network, a skin detection neural network, a waterfall detection neural network), an object-based concept detection neural network, or an object class detection neural network. For example, the object classification AI model 210 comprises an object class detection neural network that utilizes the techniques and approaches found in U.S. patent application Ser. No. 16/388, 115, "Robust Training of Large-Scale Object Detectors with Noisy Data," filed on Apr. 8, 2019, which is incorporated herein by reference in its entirety. Alternatively, the object classification AI model 210 comprises a neural network as described in S. Ren, K. He, R. Girshick, and J. Sun, *Faster r-cnn: Towards real-time object detection with region proposal networks*, NIPS, 2015, the entire contents of which are hereby incorporated by reference.

As shown by FIG. 2, an image editing application 112 allows for editing of digital images or other computer vision tasks related to digital images that utilize derived attributes. For example, in one or more implementations, one or more sub-routines 203, such as an auto-masking task 202 or scripting 204 task, require a derived attribute. The image editing application 112 (or the sub-routines 203) sends a request to the object attribute cache and management system 102 (e.g., via the central or universal request API). For instance, FIG. 2 illustrates the object attribute cache and management system 102 receiving requests from the image editing application 112 to generate a derived attribute from/ for the digital image 200. Specifically, FIG. 2 shows the derived attribute request management system 104 receiving requests from the image editing application 112 for performing sub-routines 203, such as auto-masking 202 or scripting 204 in relation to the digital image 200.

In response to receiving a request for a derived attribute, the object attribute cache and management system 102 determines whether the requested derived attribute is available at the derived attribute cache 106. If the requested derived attribute is available at the derived attribute cache 106, the object attribute cache and management system 102 retrieves the requested derived attribute from the derived attribute cache 106. The object attribute cache and management system 102 then returns the derived attribute to the image editing application 112. Furthermore, when available at the derived attribute cache 106, the object attribute cache and management system 102 returns the derived attribute to the image editing application 112 without requesting the derived attribute from the artificial intelligence models 114. In this manner, the object attribute cache and management system 102 provides for efficient caching and reuse of derived attributes to reduce computing resources and increase speed of image editing/computer vision operations.

Upon determining that a requested derived attribute is not available at the derived attribute cache 106, the object attribute cache and management system 102 sends instructions to the applicable artificial intelligence model 114 to generate the requested derived attribute. In other words, the object attribute cache and management system 102 utilizes an artificial intelligence model 114 to generate the derived attribute based on pixels of the digital image 200. The object attribute cache and management system 102 performs the generation of the derived attribute in the background of the operation of the image editing application 112 in a manner that the image editing application 112 is able to continue to operate normally during this processing. Furthermore, the object attribute cache and management system 102 provides a reference to the pending request in order to detect or be notified upon completion of the generation of the derived attribute by the artificial intelligence model 114. Specifically, the reference, in one or more implementations, comprises a source identifier and an attribute type. For example, the source identifier comprises an indication of the pixels from which the attribute will be derived (e.g., a particular layer, or the layer mask on a particular layer, or a certain color channel within a particular layer, or the document composite). The attribute type, in one or more implementations, refers to a categories of AI attribute (e.g., faces, classification, objects, etc.).

Upon generation of the derived attribute by the applicable artificial intelligence model 114, the object attribute cache and management system 102 stores the derived attribute in the derived attribute cache 106. The object attribute cache and management system 102 also returns the generated derived attribute to the image editing application 112 in response to the request.

Figure 3:
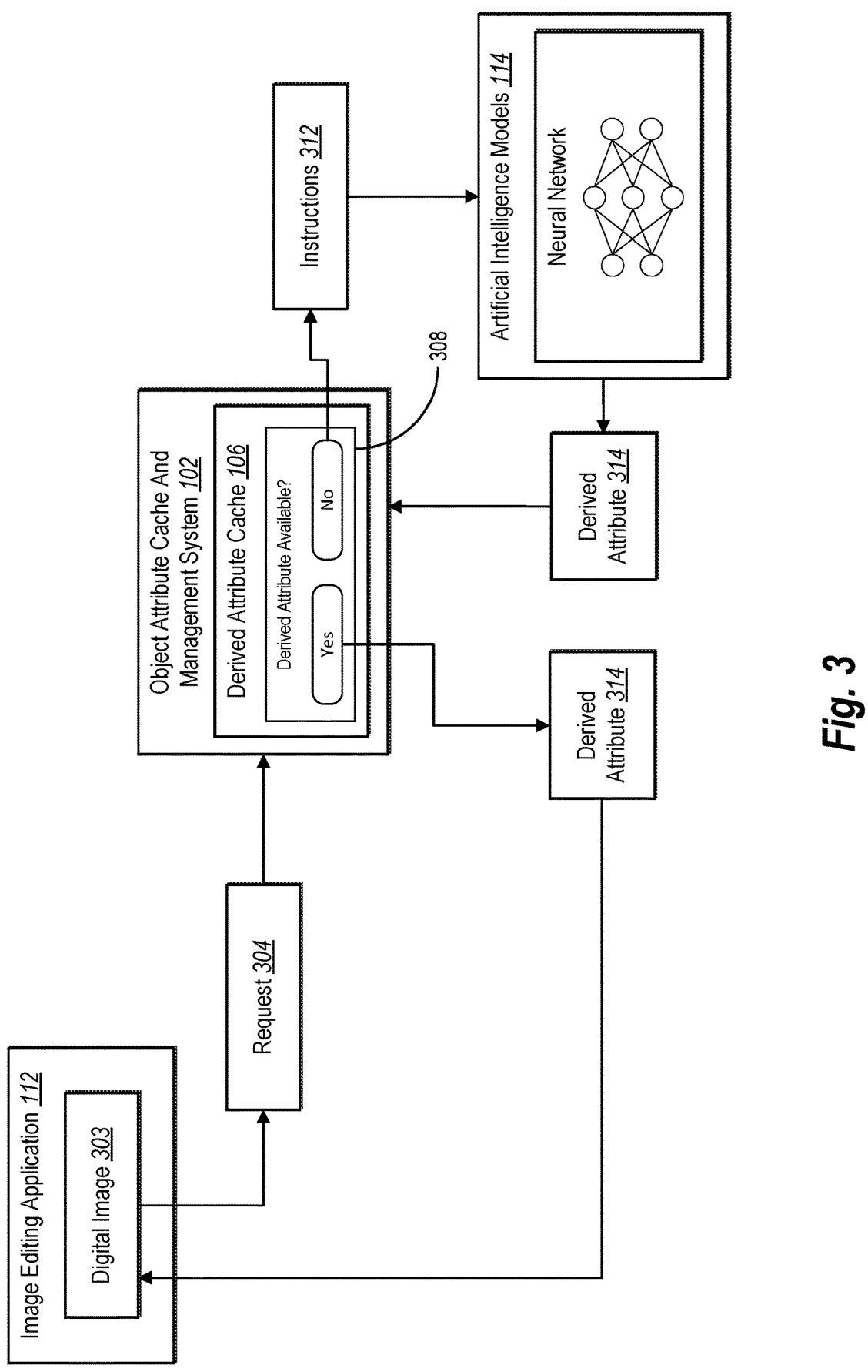
FIG. 3 illustrates a block diagram of the object attribute cache and management system determining the availability of a derived attribute in the derived attribute cache in accordance with one or more embodiments.

As discussed above, the object attribute cache and management system 102 determines the availability of derived attributes at the derived attribute cache 106. For instance, FIG. 3 illustrates that the object attribute cache and management system 102 receives a request 304 from the image editing application 112 for a derived attribute 314 for a digital image 303. Upon receiving the request 304, the object attribute cache and management system 102 determines the availability of the derived attribute 314 at the derived attribute cache 106. If the object attribute cache and management system 102 determines that the derived attribute 314 is available in the derived attribute cache 106, then the object attribute cache and management system 102 returns the derived attribute 314 to the image editing application 112. As shown by FIG. 3, the object attribute cache and management system 102 does so without invoking the artificial intelligence models 114. In other words, rather than utilizing the artificial intelligence models 114 to generate a requested derived attribute automatically, the object attribute cache and management system 102 intelligently stores and reuses derived attributes.

More specifically, when the object attribute cache and management system 102 determines the availability of the derived attribute 314, the object attribute cache and management system 102 compares metadata of the requested derived attribute 314 against derived attributes stored in the derived attribute cache 106. In one or more example embodiments, if the derived attribute cache 106 has stored derived attribute X, the metadata included with derived attribute X includes at least one of: (1) an identification of the location of the derived attribute in the digital image 303; (2) an identification of the category of derived attribute in the digital image 303 (i.e., category such as, animal, human, car, background, and foreground); (3) an identification of the layer of digital image 303 from which the derived attribute X is requested; (4) the edit state of the derived attribute; and/or (5) features of derived attribute X in the digital image 303. In one or more implementations, the derived attribute cache 106 has a plurality of derived attributes stored therein with associated metadata.

To determine whether a derived attribute is stored within the derived attribute cache 106, the object attribute cache and management system 102 compares the metadata for derived attribute 314 from the request 304 with the metadata of each of the plurality of stored derived attributes in the derived attribute cache 106. For example, the object attribute cache and management system 102 analyses the most relevant metadata components of each derived attribute in the derived attribute cache 106 and filters irrelevant derived attributes. From the remaining relevant derived attributes, the object attribute cache and management system 102 then utilizes more specific metadata components to narrow down the derived attributes and determine whether there is an exact match. The object attribute cache and management system 102 utilizes intelligent determinations to rank the order of metadata components considered based on theoretical or historical data. In some instances, when the object attribute cache and management system 102 determines an exact match in the derived attribute cache 106, the object attribute cache and management system 102 returns the derived attribute 314 from the derived attribute cache 106 to the image editing application 112.

As discussed above, the process of determining the availability of the derived attribute 314 in the derived attribute cache 106 includes comparing metadata between derived attributes and the request 304 for the derived attribute 314. In some example embodiments, the determination is binary, i.e., the object attribute cache and management system 102 determines the attribute as available or unavailable. In other example embodiments, the object attribute cache and management system 102 uses an intelligent determination to not only determine the availability of the derived attribute 314 in the derived attribute cache 106, but to also to determine if the object attribute cache and management system 102 previously received a request for the derived attribute 314. Essentially, the object attribute cache and management system 102 determines that it received a prior request identical to the request 304. The object attribute cache and management system 102 subsequently does not forward instructions 312 to the artificial-intelligence models 114. Instead, the object attribute cache and management system 102 merges requests is discussed in more detail in relation to FIG. 4.

In one or more implementations, if the object attribute cache and management system 102 determines that the derived attribute 314 is unavailable at the derived attribute cache 106 based on not finding a match, the object attribute cache and management system 102 forwards instructions 312 to the artificial-intelligence models 114 to generate the derived attribute 314. An artificial-intelligence models 114 (e.g., a neural network) then derives the derived attribute 314. In particular, the object attribute cache and management system 102 uses artificial-intelligence models 114 to derive attributes from the digital image 303. In response to the instructions 312 received from the object attribute cache and management system 102, the artificial-intelligence models 114, utilize models such as those outlined in FIG. 2 (e.g., masking AI model 206, face detection AI model 208, or an object classification AI model 210).

In one or more implementations, the artificial-intelligence models 114 generate primary and secondary derived attributes. For example, the artificial-intelligence models 114 generate a primary derived attribute in order to provide a fast response. In one or more implementations, the artificial-intelligence models 114 derive preliminary derived attributes utilizing less computational resources than those utilized to generate secondary derived attributes. Based on the primary derived attribute, the artificial-intelligence models 114 generate a secondary derived attribute. The artificial-intelligence models 114 derive secondary derived attributes with more computational resources to provide additional details that a preliminary derived attribute may lack. In one or more implementations, the object attribute cache and management system 102 stores the primary and secondary derived attributes within the derived attribute cache 106 together. The object attribute cache and management system 102 also removes the primary and secondary derived attributes together, which is further detailed in relation to FIG. 5.

Upon generation of the derived attribute, the object attribute cache and management system 102 stores the derived attribute 314 in the derived attribute cache 106. Subsequently or in parallel, the object attribute cache and management system 102 returns the derived attribute 314 to the image editing application 112 in response to the request 304.

As mentioned, in one or more example embodiments, the image editing application 112 operates normally while the object attribute cache and management system 102 or the artificial-intelligence models 114 operate in the background. The object attribute cache and management system 102 operating in the background allows for normal operation of the image editing application 112, which speeds up the overall functioning of the image editing application 112 and reduces potential latencies.

Moreover, in some example embodiments, after the artificial-intelligence models 114 derive the derived attribute 314, the object attribute cache and management system 102 sends a notification to the image editing application 112. For example, a notification is a textual, visual or audio indicator of an event. In particular, a notification includes a textual indicator that the derived attribute 314 is ready. To illustrate, if the user requested an attribute for an animal in the digital image 303, the object attribute cache and management system 102 notifies the image editing application 112 that the derived attribute 314 for the animal is ready for the user to perform editing functions.

In one or more example embodiments, the derived attribute cache 106 only stores derived attributes for the duration of a single session within the image editing application 112. Accordingly, when the user closes out of the image editing application 112, the object attribute cache and management system 102 clears the derived attributes stored in the derived attribute cache 106. In alternative implementations, the object attribute cache and management system 102 saves the derived attribute cache such that the derived attributes stored in the derived attribute cache 106 last beyond a single session. Thus, closing out of the image editing application 112 does not clear the derived attribute cache 106. On subsequent sessions within the image editing application 112, the object attribute cache and management system 102 accesses the previously stored derived attributes in the derived attribute cache 106 associated with a digital image being processed.

Figure 4:
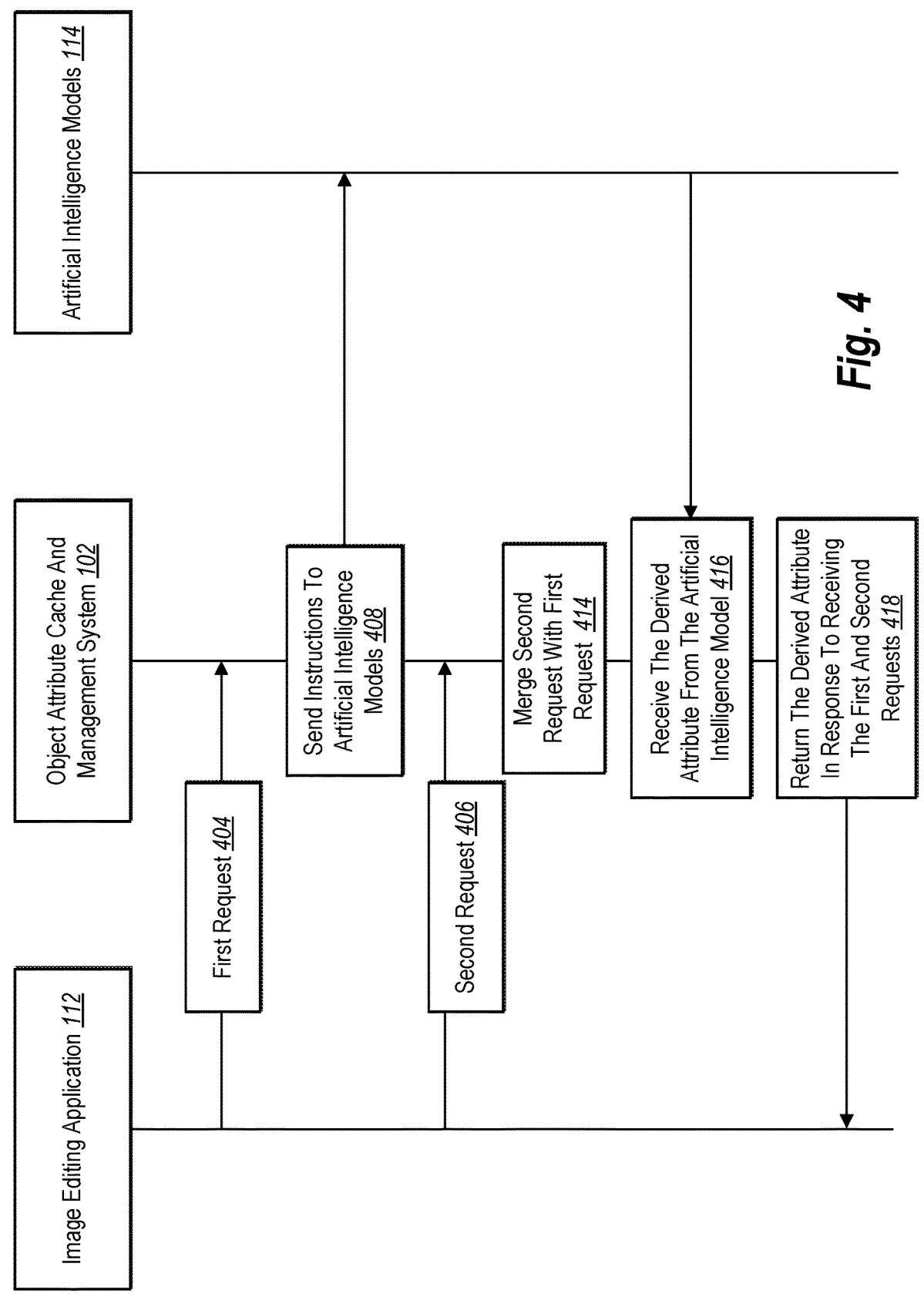
FIG. 4 illustrates a diagram of the object attribute cache and management system receiving multiple requests for the same derived attribute in accordance with one or more embodiments.

As discussed above, the object attribute cache and management system 102 merges requests, when applicable, to reduce duplicative processing. Turning to FIG. 4, an overview of the object attribute cache and management system 102 merging requests is provided. As shown, the image editing application 112 sends a first request 404 to the object attribute cache and management system 102 for a derived attribute. In response to receiving the first request 404, the object attribute cache and management system 102 determines that the derived attribute is not available at the derived cache 106. In response to which, the object attribute cache and management system 102 performs an act 408 of sending instructions to the one or more artificial-intelligence models 114 to generate the derived attribute. As mentioned, the object attribute cache and management system 102 operates in the background, allowing the image editing application 112 to resume normal operation. In one or more example embodiments, the object attribute cache and management system 102 generates a reference for the pending first request 404 being processed by the artificial intelligence models 114.

In some example embodiments, subsequent to the first request 404, the object attribute cache and management system 102 receives a second request 406 for the same derived attribute. The object attribute cache and management system 102 utilizes an intelligent determination to determine whether the derived attribute cache 106 already includes the second request and whether the object attribute cache and management system 102 received an identical prior request. Note that identical prior requests, in one or more implementations, comprises a parallel request.

In particular, the object attribute cache and management system 102, upon receiving the second request 406 for the derived attribute, determines whether the second request 406 is a repetitive request. In one or more implementations, the object attribute cache and management system 102 utilizes a process similar to determining whether the derived attribute cache 106 contains a requested derived attribute. In particular, the object attribute cache and management system 102 compares the second request 406 against references for pending prior requests. For example, the object attribute cache and management system 102 utilizes metadata of the prior requests and compares them to the metadata of the second request 406. The object attribute cache and management system 102 optionally uses the most relevant metadata to narrow down the list of potentially identical requests and then optionally uses more specific metadata components to determine whether the second request 406 is identical to any prior requests (such as the first request 404).

Once the object attribute cache and management system 102 determines the second request 406 is identical to a prior request, (i.e., the first request 404), the object attribute cache and management system 102 merges the second request 406 with the first request 404 via an act 414. Merging the requests together causes the object attribute cache and management system 102 to withhold forwarding repetitive instructions to the one or more artificial-intelligence models 114. More specifically, the object attribute cache and management system 102 associates a reference for the second request 406 with the reference for the first request 404. In this manner, a response to the instructions to generate a derived attribute in response to the first request 404 will be considered as a response to the second request 406.

After merging, the object attribute cache and management system 102 receives 416 the derived attribute for the first request 404 from the one or more artificial-intelligence models 114. In response to the receipt of the derived attribute, the object attribute cache and management system 102 determines identifies the reference for the first request 404, which is linked to the reference for the second request 406. As such, the object attribute cache and management system 102 treats the received derived attribute as a response to both the first and second requests 404, 406. The object attribute cache and management system 102 then performs an act 418 of returning the derived attribute to the image editing application 112 in response to receiving the first request 404 and the second request 406.

Figure 5:
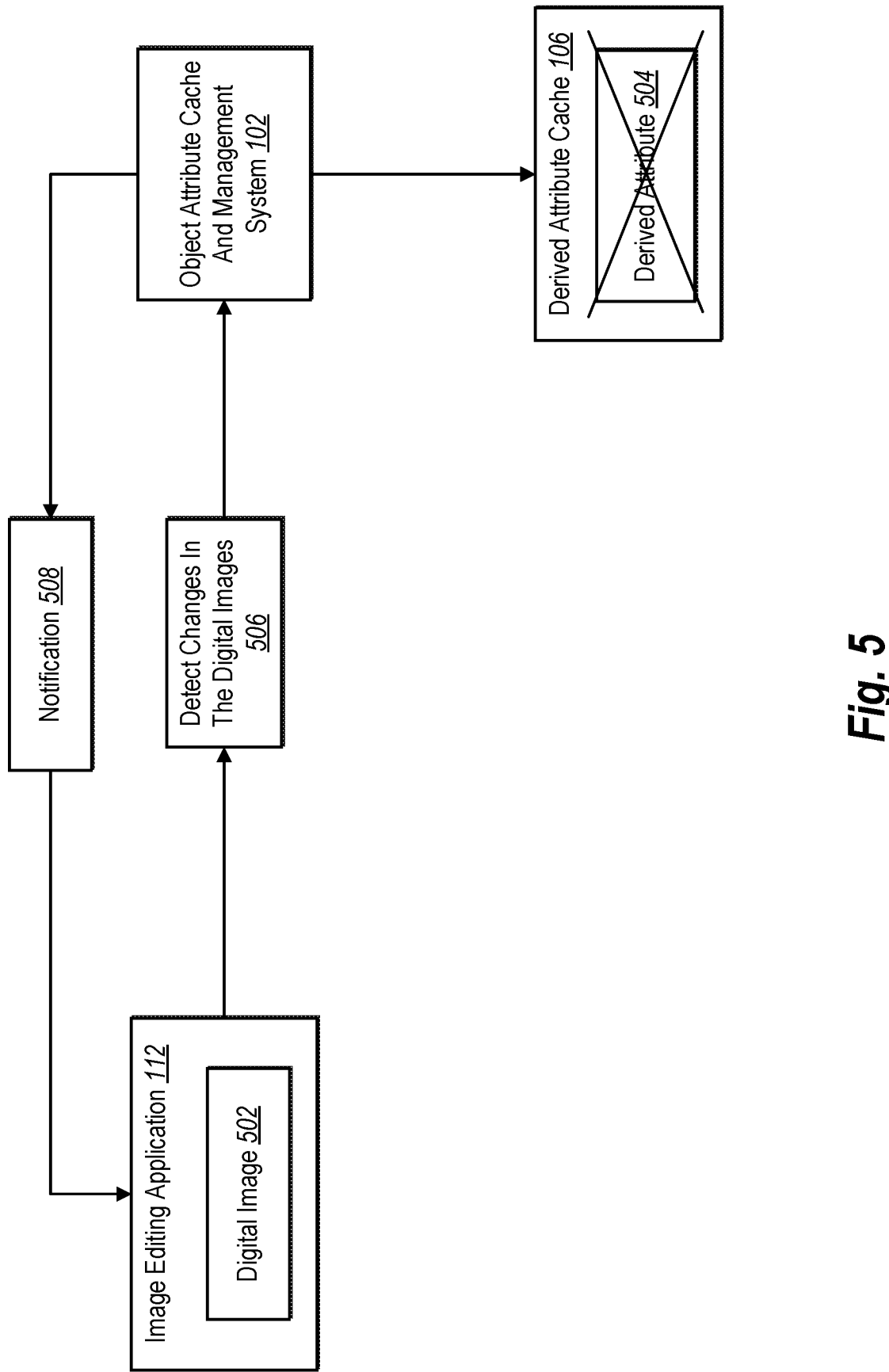
FIG. 5 illustrates a block diagram of the object attribute cache and management system removing a derived attribute from the derived attribute cache in accordance with one or more embodiments.

In one or more implementation, the object attribute cache and management system 102 detects changes to the digital image as part of ensuring that relevant derived attributes are maintained at the derived attribute cache 106. For example, FIG. 5 provides an overview of the object attribute cache and management system 102 detecting changes to a digital image 502 made utilizing the image editing application 112 and removing a derived attribute 504 from the derived attribute cache 106 in response to a change. In particular, as mentioned above, the object attribute cache and management system 102 generates derived attributes from pixels of a digital images. If the underlying pixels used to generate a derived attribute are changed, there is a possibility that the derived attribute is outdated. To ensure that the object attribute cache and management system 102 does not provide outdated derived attributes, the object attribute cache and management system 102 monitors changes to a digital images and deletes any derived attributes generated based on pixels that have since changed.

In one or more implementations, the object attribute cache and management system 102 monitors changes to a digital image 502 made by the image editing application 112. For example, the object attribute cache and management system 102 detects changes in the digital image 502 via changes in the pixel composition of the digital image 502. In particular, the object attribute cache and management system 102 detects one or more pixel changes to a layer of the digital image 502 or the composite of the digital image 502. Either a single layer pixel change or a composite layer pixel change indicates to the object attribute cache and management system 102 to determine whether to remove the derived attribute 504 from the derived attribute cache 106.

For example, an image editing workflow requests a panoptic segmentation (a derived attribute) of a digital image. The object attribute cache and management system 102 generates the panoptic segmentation utilizing the one or more artificial intelligence models 114 and returns the panoptic segmentation to the image editing application 112. In response, the image editing application 112 generates a new image later for the digital image 502 and performs a content aware fill operation to replace the pixels of an object indicated by the panoptic segmentation. In this case, because the changes are made in a new layer, the underlying image pixels used to generate the panoptic segmentation have not changed. As such, upon detecting this change to the digital image 502, the object attribute cache and management system 102 will not determine that the panoptic segmentation is stale or delete the panoptic segmentation from the derived attribute cache 106. However, in another implementations, the image editing application 112 deletes an object from the digital image 502, thereby modifying the pixels of the digital image 502. Upon detecting this change to the digital image 502, the object attribute cache and management system 102 will determine that the panoptic segmentation is stale because at least some of the pixel used to generate the panoptic segmentation have been modified. In response, the object attribute cache and management system 102 sends the notification 508 to the image editing application 112 and deletes the panoptic segmentation from the derived attribute cache 106.

In one or more example embodiments, in response to the object attribute cache and management system 102 performing the act 506 of detecting changes in the digital image, the object attribute cache and management system 102 compares the detected changes to the derived attributes in the derived attribute cache 106. Comparing the detected changes to the derived attributes is similar to the process of comparing metadata components discussed in FIGS. 3 and 4.

For example, the object attribute cache and management system 102 receives a signal that one or more changes has occurred in the digital image 502. The object attribute cache and management system 102 compares the metadata components of the detected changes with the metadata components of the derived attributes stored in the derived attribute cache 106. In particular, if the detected change modified pixels of the digital image, then the object attribute cache and management system 102 sifts through the derived attributes in the derived attribute cache 106 to identify and remove any derived attribute 504 that was generated from the now modified pixels.

In one or more example embodiments, the object attribute cache and management system 102 sends a notification 508 to the image editing application 112 indicating removal (or pending removal) of a derived attribute 504. The notification allows the image editing application 112 to re-request the to be deleted derived attribute 504 if needed. If requested, the object attribute cache and management system 102 sends the derived attribute 504 to the image editing application 112 or delays or prevents deletion of the derived attribute 504 from the derived attribute cache 106. In one or more implementations, the notification 508 is sent to feature, processes, or sub-routines registered to receive notifications from the object attribute cache and management system 102.

In one or more example embodiments, the object attribute cache and management system 102 determines that the detected changes to the digital image 502 did not render any derived attributes in the derived attribute cache 106 obsolete. In this situation, the object attribute cache and management system 102 does not remove any derived attributes from the derived attribute cache 106.

In certain other example embodiments, the object attribute cache and management system 102 detects change reversions. For example, a reversion restores changes back to an original state. In particular, the object attribute cache and management system 102 monitors not only changes to the digital image 502, but also reversions to the digital image 502. As such, undone changes notifies the object attribute cache and management system 102 of a reversion. For example, the object attribute cache and management system 102 subsequently identifies the previously removed derived attribute 504 from the derived attribute cache 106 and searches a short-term discard cache. If the object attribute cache and management system 102 locates the derived attribute 504 in the short-term discard cache, then the object attribute cache and management system 102 restores the derived attribute 504 back to the derived attribute cache 106. If the object attribute cache and management system 102 cannot locate the derived attribute 504 in the short-term discard cache, then the object attribute cache and management system 102 sends instructions to the one or more artificial-intelligence models 114 to re-derive the derived attributes from the digital image 502. The object attribute cache and management system 102 detecting changes and reversions to the digital image 502 improves the efficiency of the derived attribute cache 106.

Figure 6:
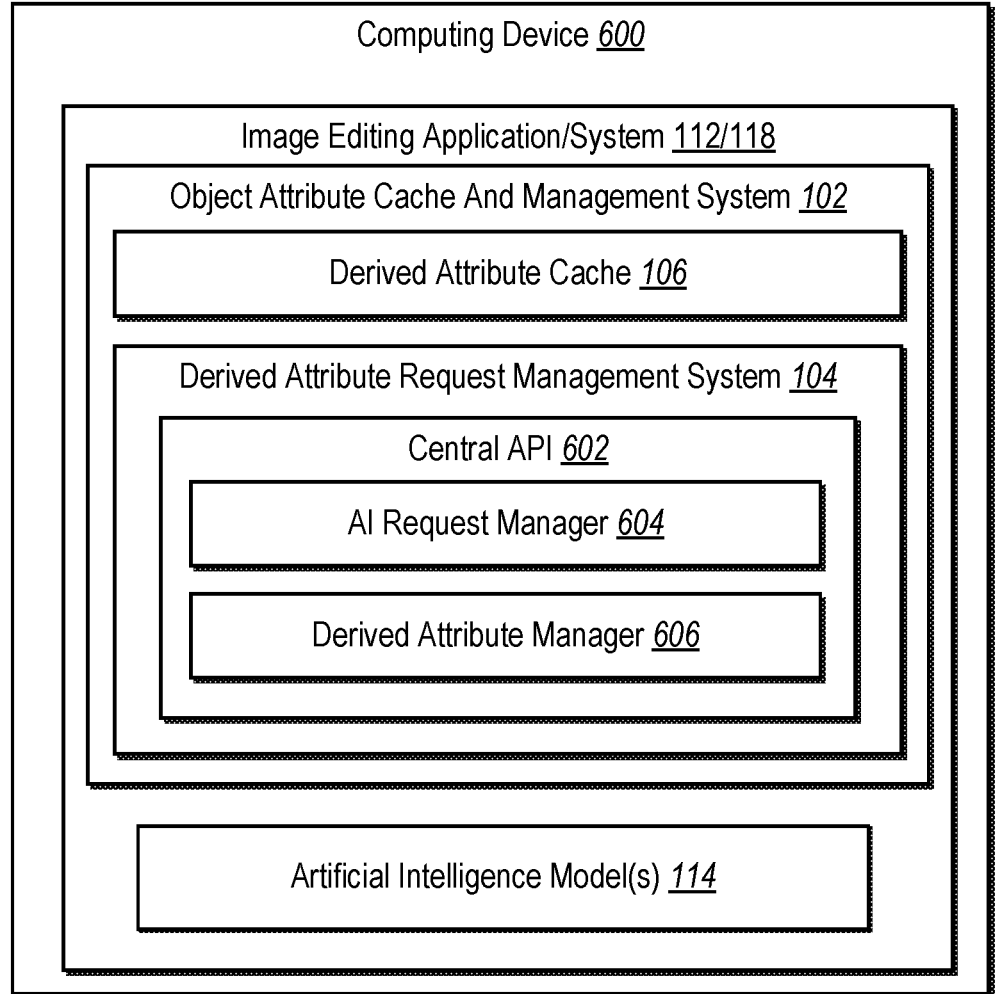
FIG. 6 illustrates an example series of acts for determining availability of a derived attribute in the derived attribute cache in accordance with one or more embodiments.

Referring now to FIG. 6, additional detail is provided regarding the capabilities and components of the object attribute cache and management system 102 in accordance with one or more implementations. In particular, FIG. 6 shows a schematic diagram of an example architecture of the object attribute cache and management system 102 implemented within the image editing application 112 and executed on a computing device 600.

As shown, the object attribute cache and management system 102 is located on a computing device 600 within an image editing system/application 118/112. In general, the computing device 600 may represent various types of client devices. For example, in some implementations, the client is a mobile device, such as a laptop, a tablet, a mobile telephone, a smartphone, etc. In other implementations, the computing device 600 is a non-mobile device, such as a desktop or server, or another type of client device. Additional details with regard to the computing device 600 are discussed below as well as with respect to FIG. 8.

As illustrated in FIG. 6, the object attribute cache and management system 102 includes various components for performing the processes and features described herein. For example, the derived attribute cache 106, the derived attribute request management system 104, and the artificial intelligence models 114. Each of the components mentioned above is described below in turn.

The derived attribute cache 106 stores attributes derived by the artificial intelligence models 114 from pixels of a digital image. The derived attribute request management system 104 comprises a central API 602 that manages all requests for derived attributes. Furthermore, the derived attribute request management system 104 includes an AI request manager 604 that receives, merges, and/or forwards request for derived attributes (e.g., generates instructions for an artificial intelligence model 114 to generate a derived attribute). The derived attribute request management system 104 also includes a derived attribute manager 606 that verifies whether a requested derived attribute is stored in the derived attribute cache 106 and deletes stale derived attributes.

Each of the components of the object attribute cache and management system 102 optionally includes software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the object attribute cache and management system 102 causes a computing device to provide derived attributes as described herein. Alternatively, the components optionally include hardware, such as a special-purpose processing device to perform a certain function or group of functions. In addition, the components of the object attribute cache and management system 102 optionally includes a combination of computer-executable instructions and hardware.

Furthermore, the components of the object attribute cache and management system 102 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-6, the corresponding text, and the examples provide a number of different methods, systems, devices, and non-transitory computer-readable media of the object attribute cache and management system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for determining availability of derived attributes in a derived attribute cache in accordance with one or more embodiments. The series of acts 700 includes an act 702 of storing one or more attributes derived from a digital image by one or more artificial-intelligence models in a derived attribute cache. The act 702 also includes receiving the derived attribute from the one or more artificial-intelligence models and storing the derived attribute in the derived attribute cache. The act 702 of storing one or more attributes comprises storing at least one of location of human faces, location of objects, object classifications, depth information, or latent features. Furthermore, the one or more attributes further comprises a primary derived attribute and a secondary derived attribute corresponding to one another.

As shown, the series of acts 700 also includes an act 704 of receiving a request for a derived attribute for the digital image from an image editing application. The act 704 further includes receiving the request for the derived attribute for the digital image via an application programming interface. The act 704 of receiving the request for the derived attribute for the digital image via an application programming interface also includes the application programming interface operating in the background of the image editing application in response to processing the received request for the derived attribute.

Moreover, the act 704 of receiving the request for the derived attribute further includes merging the request for the derived attribute with a prior request for the derived attribute. Wherein merging the request for the derived attribute with the prior request for the derived attribute comprises determining that the prior request for the derived attribute is for the same derived attribute and associating the request and the prior request together. Merging the requests for the derived attribute with the prior request for the derived attribute also includes comparing metadata between the prior request and the request for the derived attribute, determining that a derived attribute requested in the prior request is the same as the derived attribute in the request, receiving the derived attribute from the one or more artificial-intelligence models based on instructions sent to the one or more artificial-intelligence models based on the prior request, and returning the derived attribute in response to the prior request and the request.

As shown, the series of acts 700 includes an act 706 of determining that the derived attribute from the request is stored at the derived attribute cache. The act 706 of determining that the derived attribute is stored at the derived attribute cache also includes returning the derived attribute in response to the request, which comprises returning the derived attribute in response to the request without forwarding the request to the one or more artificial-intelligence models configured to generate the derived attribute. Furthermore, the act 706 includes comparing metadata from the request for the derived attribute with a plurality of derived attributes in the derived attribute cache.

Moreover, the act 706 of determining that the derived attribute from the request is stored at the derived attribute cache further comprises detecting one or more changes to the digital image, determining that a derived attribute in the derived attribute cache is obsolete based on the detected changes in the digital image, and removing the derived attribute corresponding to the detected changes from the derived attribute cache. Wherein detecting changes in the digital image comprises at least one of detecting pixel changes in an individual layer of the digital image or detecting composite layer changes in the digital image. Removing the derived attribute corresponding to the detected changes from the derived attribute cache further comprises sending a notification to the image editing application regarding the removal of the derived attribute corresponding to the detected changes from the derived attribute cache. Detecting a change in the digital image further includes detecting a reversion of the change in the digital image and restoring the derived attribute, corresponding to the reversion of the change, back to the derived attribute cache.

As shown, the series of acts 700 includes an act 708 of returning the derived attribute to the image editing application in response to the request without forwarding the request to the one or more artificial-intelligence models configured to generate the derived attribute. Thus, if the derived attribute is available at the derived attribute cache returning the derived attribute in response to the request. However, if the derived attribute is unavailable at the derived attribute cache, obtaining the derived attribute from the one or more artificial-intelligence models. The one or more artificial-intelligence models comprises at least one of a machine learning model or a neural network. Wherein obtaining the derived attribute from the one or more artificial-intelligence models comprises sending instructions to the one or more artificial-intelligence models to derive an attribute or merging the request for the derived attribute with a prior request for the derived attribute. When the one or more artificial-intelligence models has derived an attribute, the act 708 further comprises sending a notification to the image editing application that the derived attribute is ready.

While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 8:
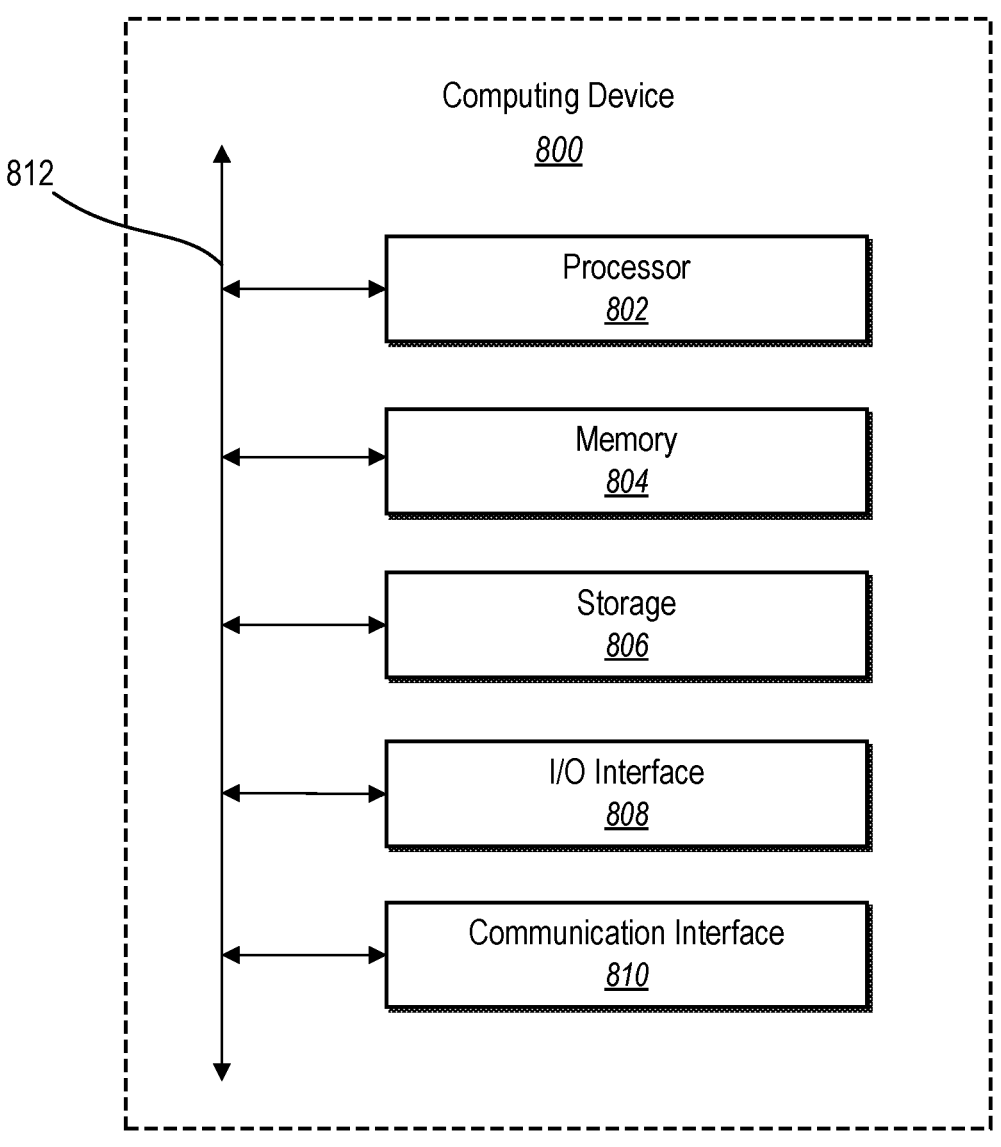
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., computing device 600, server device (s)110 and client devices 116). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders.

Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer device to perform operations comprising:

storing, in a derived attribute cache while editing a digital image, one or more attributes derived from the digital image by one or more artificial-intelligence models in connection with one or more previous edits to the digital image;

receiving, from an image editing application, a request for a derived attribute for the digital image in connection with an edit to the digital image;

determining whether the derived attribute is available at the derived attribute cache;

if the derived attribute is unavailable at the derived attribute cache, obtaining the derived attribute from the one or more artificial-intelligence models and storing the derived attribute in the derived attribute cache;

if the derived attribute is available at the derived attribute cache, returning the derived attribute to the image editing application in response to the request; and completing, utilizing the derived attribute, the edit to the digital image.

2. The non-transitory computer-readable medium of claim 1, wherein receiving the request for the derived attribute for the digital image comprise receiving the request via an application programming interface from an image editing application.

3. The non-transitory computer-readable medium of claim 1, further comprising instructions that, when executed by the at least one processor, cause the computer device to perform operations comprising:

receiving the derived attribute from the one or more artificial-intelligence models; and storing the derived attribute in the derived attribute cache.

4. The non-transitory computer-readable medium of claim 1, wherein returning the derived attribute in response to the request comprises returning the derived attribute in response to the request without forwarding the request to the one or more artificial-intelligence models configured to generate the derived attribute.

5. The non-transitory computer-readable medium of claim 1, wherein the one or more attributes derived from the digital image comprises at least one of:

location of human faces;

location of objects;

object classifications;

depth information; or latent features.

6. The non-transitory computer-readable medium of claim 1, wherein the one or more artificial-intelligence models comprises at least one of a machine learning model or a neural network.

7. The non-transitory computer-readable medium of claim 1, wherein determining if the derived attribute is available at the derived attribute cache comprises:

comparing metadata from the request for the derived attribute with a plurality of derived attributes in the derived attribute cache;

determining relevant derived attributes by filtering the plurality of derived attributes in the derived attribute cache based on the metadata; and comparing additional metadata from the request for the derived attribute with the relevant derived attributes in the derived attribute cache.

8. The non-transitory computer-readable medium of claim 1, wherein obtaining the derived attribute from the one or more artificial-intelligence models comprises at least one of:

sending instructions to the one or more artificial-intelligence models to derive an attribute; or merging the request for the derived attribute with a prior request for the derived attribute.

9. The non-transitory computer-readable medium of claim 8, wherein merging the request for the derived attribute with the prior request for the derived attribute comprises:

determining that the prior request for the derived attribute is for the derived attribute; and associating the request and the prior request together.

10. In a digital medium environment in which attributes are derived from digital images by artificial-intelligence models, a method comprising:

storing, while editing a digital image, one or more attributes derived from the digital image by one or more artificial-intelligence models in connection with one or more previous edits to the digital image in a derived attribute cache;

receiving, from an image editing application, a request for a derived attribute for the digital image in connection with an edit to the digital image from an image editing application;

determining that the derived attribute from the request is stored at the derived attribute cache;

returning the derived attribute to the image editing application in response to the request without forwarding the request to the one or more artificial-intelligence models configured to generate the derived attribute; and completing, utilizing the derived attribute, the edit to the digital image.

11. The method of claim 10, further comprising:

merging a prior request with the request for the derived attribute by:

comparing metadata between the prior request and the request for the derived attribute;

determining that a derived attribute requested in the prior request is the derived attribute in the request;

receiving the derived attribute from the one or more artificial-intelligence models based on instructions sent to the one or more artificial-intelligence models based on the prior request; and returning the derived attribute in response to the prior request and the request.

12. The method of claim 10, further comprising:

detecting one or more changes to the digital image;

determining that a derived attribute in the derived attribute cache is obsolete based on the one or more changes to the digital image; and removing the derived attribute corresponding to the one or more changes from the derived attribute cache.

13. The method of claim 12, wherein detecting changes in the digital image comprises at least one of detecting pixel changes in an individual layer of the digital image or detecting composite layer changes in the digital image.

14. The method of claim 12, wherein removing the derived attribute corresponding to the one or more changes from the derived attribute cache further comprises sending a notification to the image editing application regarding removal of the derived attribute corresponding to the one or more changes from the derived attribute cache.

15. The method of claim 10, further comprising sending a notification to the image editing application that the derived attribute is ready.

16. A system for storing one or more attributes derived from a digital image, comprising:

at least one memory device comprising a derived attribute cache storing one or more attributes derived from a digital image by one or more artificial-intelligence models; and at least one processor configured to cause the system to:

receive, via an application programming interface from an image editing application while editing the digital image, a request for a derived attribute for the digital image in connection with an edit to the digital image;

determine whether the derived attribute from the request is stored at the derived attribute cache in connection with one or more previous edits to the digital image;

if the derived attribute is unavailable at the derived attribute cache, send a request to the one or more artificial-intelligence models to derive the derived attribute;

if the derived attribute is available at the derived attribute cache, return the derived attribute to the image editing application in response to the request; or if a prior request for the derived attribute has already been received, merge the request with the prior request; and complete, utilizing the derived attribute, the edit to the digital image.

17. The system of claim 16, wherein the application programming interface operates in a background of the image editing application in response to processing the request for the derived attribute.

18. The system of claim 16, wherein the derived attribute comprises a primary derived attribute and a secondary derived attribute corresponding to one another.

19. The system of claim 16, further comprising:

detecting a change to one or more pixels from which the derived attribute is derived in the digital image;

removing the derived attribute corresponding to the change from the derived attribute cache; and sending a notification to the image editing application regarding a removal of the derived attribute corresponding to the change from the derived attribute cache.

20. The system of claim 16, further comprises:

detecting a change in the digital image;

removing the derived attribute corresponding to the change from the derived attribute cache;

detecting a reversion of the change in the digital image; and restoring the derived attribute, corresponding to the reversion of the change, back to the derived attribute cache.

* * * * *